H. LOVE.
MEAT ROASTER.
APPLICATION FILED MAY 9, 1918.

1,344,915.

Patented June 29, 1920.

Inventor
HARRY LOVE
By his Attorney
Frans H. Ashley

UNITED STATES PATENT OFFICE.

HARRY LOVE, OF STATEN ISLAND, NEW YORK.

MEAT-ROASTER.

1,344,915.              Specification of Letters Patent.    Patented June 29, 1920.

Application filed May 9, 1918. Serial No. 233,488.

*To all whom it may concern:*

Be it known that I, HARRY LOVE, a citizen of the United States, and a resident of Staten Island, West New Brighton, in the county of Richmond and State of New York, have invented certain new and useful Improvements in Meat-Roasters, of which the following is a specification.

This invention relates to cooking apparatus and is directed particularly to a novel and useful apparatus for roasting meats.

Among the objects of my invention are the providing of a meat roaster that shall be simple in construction and efficient in its operation. In particular my object is to provide an apparatus for roasting meats which shall have means whereby the meat may be held in any heating apparatus so as to be evenly exposed to the heating surface and readily rotated in a horizontal plane. My object is further to provide means whereby the gravy or meat juices may readily flow down directly into the roast pan without spreading, and to further provide meat holding apparatus which is slidable in the roast pan so that the gravy may be made available to the cook when desired by moving the meat holding apparatus back and forth in the pan.

Other objects and advantages of this invention will appear from the detailed description and the features of novelty will be particularly pointed out in the claims.

Figure 1:
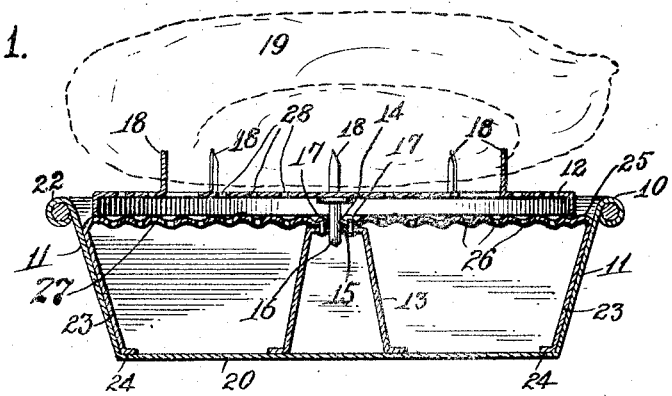
Figure 2:
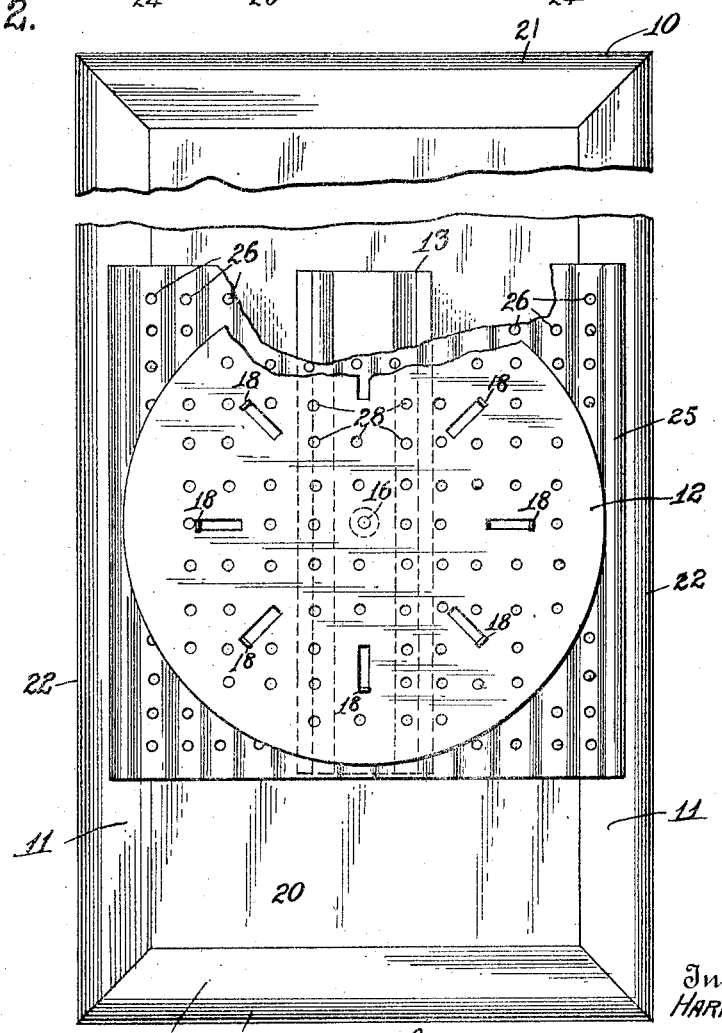

In the drawing accompanying this specification and forming a material part thereof, Figure 1 is a cross-sectional view of my newly improved meat roasting apparatus showing the meat in place on the turn table, and Fig. 2 is a plan view thereof with the meat removed.

Referring in detail to the drawing, the embodiment of my invention there shown is seen to consist of the roast pan 10 and the supporting frame 11 slidable thereon. On this supporting frame I mount the meat holder 12 which I make preferably in the form of a turn table rotatably mounted on the supporting frame and the stand 13, the top of the supporting frame having a recess 14 therein registering with an opening 15 in the top of the stand for the pinion 16 extending down from the turn table. The holding frame and supporting stand may be secured rigidly together at the top by means such as the rivets 17. The turn table is provided with upstanding pointed projections 18 on which the meat 19 may be securely removably held.

The roast pan is preferably trapezoidal in cross-section and may be made from one sheet of material to provide a bottom 20 and the upstanding end and side walls 21 and 22. The supporting frame 11 may be made similarly trapezoidal in cross-section from one sheet of material and is substantially an inverted pan open at the ends and having side walls 23 formed at the bottom with extensions 24 bent substantially at right angles thereto, adapted to rest against the bottom of the roast pan and a top 25 perforated as at 26. I preferably make this top portion corrugated as shown at 27. This is extremely advantageous in that channels are thus formed whereby the gravy may easily run down into the pan from underneath any portion of the meat without spreading or running over the top. The walls of the channel further serve to shield the gravy from the heat rays.

The turn table is made also preferably from one sheet of material in the form substantially of an open cylinder having its top perforated as at 28 and adapted to rest on the supporting frame. In the form shown in the drawing I have shown the pointed meat holders or projections 18 as punched out from the turn table itself, but of course, separate holders might be secured in any suitable manner to the turn table for the same purpose. It will be noted that the roast pan is considerably longer than the supporting frame and stand, and the latter are thus slidable together in the pan and may be pushed forward or backward as desired so as to bring the meat farther in or out of the heating apparatus at the same time uncovering to either side thereof the meat juices or gravy which the cook may from time to time wish to pour on the meat being roasted, or remove into a separate utensil.

It is obvious that the stand portion 13 could be dispensed with if the supporting frame 11 is made of heavy enough material. It is also obvious that the roast could be laid directly upon the frame 11 if the turn table or meat holder 12 is removed. It will be noticed that the top of the frame 11 is located at or near the top edge of the outer pan. The object of bringing the top of the turn table or the surface on which the meat to be roasted is placed near the top of the pan is to permit the meat to be rotated on the frame even though it extends beyond the same without interfering with the sides of the pan.

The whole construction as will be readily understood is very simple, neat and compact, may be made without any difficulty from sheet material each element being in itself integral and thus carries with it not only the advantage of efficiency but also simplicity and cheapness.

Having thus described my invention what I claim as new and desire to secure by Letters Patent is:

1. A meat roaster comprising a supporting frame, a stand secured thereto and a turn table rotatably mounted on said supporting frame and stand, said supporting frame having a perforated corrugated top surface, the corrugations adapted to provide channels through which the meat juices may flow.

2. A meat roaster comprising a supporting frame, a stand secured thereto and a turn table rotatably mounted on said supporting frame and stand, said supporting frame having a perforated corrugated top surface, the corrugations adapted to provide channels through which the meat juices may flow, and said turn table having a perforated top and means upstanding therefrom for securely removably holding the meat.

3. A meat roaster comprising a supporting frame, a stand secured thereto and a turn table rotatably mounted on said supporting frame and stand, said supporting frame having a perforated corrugated top surface, the corrugations adapted to provide channels through which the meat juices may flow and said turn table having a perforated top and means upstanding therefrom for securely, removably holding the meat, each of said members being formed integral from sheet material.

4. A meat roasting apparatus comprising a roast pan, a supporting frame, a stand within said supporting frame, the tops of said supporting frame and stand being rigidly secured together and a turn table rotatably mounted on said supporting frame and stand, the latter being both slidable in said roast pan and holding means for the meat upstanding from said turn table, said roast pan being substantially longer than said supporting frame.

5. A meat roaster comprising a supporting frame adapted to rest in a pan, the top of which is perforated and corrugated and a rotatable member mounted on said frame the top of which is perforated and provided with projections.

6. A meat roaster comprising a roasting pan and a supporting frame, the top of which is corrugated and perforated and a turn-table rotatably mounted on said supporting frame, the top of which extends on a line at or above the top of the roasting pan.

7. A meat roaster comprising a roasting pan, a stand resting therein and a turn table above said stand, the top of which extends above the sides of the pan, said stand and turn table being of less length than the length of the pan to permit the stand to be reciprocated therein.

Signed at Brooklyn New York city in the county of Kings and State of New York this 30th day of April A. D. 1918.

HARRY LOVE

Witnesses:
J. C. WITTENZ,
FRANK M. ASHLEY.